(12) United States Patent
Schwartz et al.

(10) Patent No.: US 9,223,647 B2
(45) Date of Patent: Dec. 29, 2015

(54) AUTOMATIC CLASSIFICATION ADJUSTMENT OF RECORDED ACTIONS FOR AUTOMATION SCRIPT

(75) Inventors: Dror Schwartz, Holon (IL); Moshe Eran Kraus, Mazkerel Batya (IL); Yair Horovitz, Mazkerel Batya (IL); Sagi Monza, Rishon-Lezion (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 146 days.

(21) Appl. No.: 14/114,145

(22) PCT Filed: May 3, 2011

(86) PCT No.: PCT/US2011/034941
§ 371 (c)(1),
(2), (4) Date: Oct. 25, 2013

(87) PCT Pub. No.: WO2012/150932
PCT Pub. Date: Nov. 8, 2012

(65) Prior Publication Data
US 2014/0053021 A1  Feb. 20, 2014

(51) Int. Cl.
*G06F 11/07* (2006.01)
*G06F 9/455* (2006.01)
*G06F 11/36* (2006.01)

(52) U.S. Cl.
CPC ........ *G06F 11/0793* (2013.01); *G06F 9/45512* (2013.01); *G06F 11/3684* (2013.01); *G06F 11/3688* (2013.01)

(58) Field of Classification Search
CPC ............ G06F 11/3688; G06F 11/3684; G06F 11/0793; G06F 11/006; G06F 11/24; G06F 11/3414; G06F 11/3668; G06F 2201/86; G06F 2201/87
See application file for complete search history.

(56) References Cited

U.S. PATENT DOCUMENTS 7,421,683 B2 * 9/2008 Robertson et al. ............ 717/130
7,536,648 B1    5/2009 Zhao
(Continued)

FOREIGN PATENT DOCUMENTS

EP    0869433 A2    10/1998
EP    2278469 A2    1/2011
KR    20100056337 A    5/2010

OTHER PUBLICATIONS

European Patent Office, Extended European Search Report, Oct. 16, 2014, 12 pages, Munich, Germany.
(Continued)

*Primary Examiner* — Nadeem Iqbal
(74) *Attorney, Agent, or Firm* — Hewlett-Packard Patent Department

(57) ABSTRACT

A method for automatic revision of an automation script includes obtaining a sequence of at least one classified recorded action and an automation script, the automation script including a sub-sequence of the sequence of classified recorded actions, wherein each action is included in the automation script in accordance with the classification of that action. At least a portion of the automation script is executed. Upon failure of an action of the portion of the automation script to execute, an action of the sequence of classified recorded actions is reclassified, it is verified if the action that failed to execute executes successfully after the reclassifying, and the automation script is revised. Relating computer program product and data processing system are also disclosed.

20 Claims, 4 Drawing Sheets

(56) References Cited

U.S. PATENT DOCUMENTS

| | | |
|---|---|---|
| 7,716,322 B2 | 5/2010 | Benedikt et al. |
| 8,001,468 B2 * | 8/2011 | Khaladkar et al. ............ 715/704 |
| 8,171,460 B2 * | 5/2012 | Pizzoli et al. ................. 717/136 |
| 8,667,467 B2 * | 3/2014 | Dubey et al. .................. 717/125 |
| 2008/0147453 A1 * | 6/2008 | Kogan et al. ....................... 705/7 |
| 2008/0148235 A1 * | 6/2008 | Foresti et al. ................. 717/123 |
| 2008/0155514 A1 | 6/2008 | Couldwell et al. |
| 2009/0089404 A1 | 4/2009 | Guo |
| 2009/0172537 A1 | 7/2009 | Cheng et al. |
| 2012/0185823 A1 * | 7/2012 | Monza et al. .................. 717/115 |
| 2012/0239986 A1 * | 9/2012 | Kraus et al. ...................... 714/49 |
| 2014/0047410 A1 * | 2/2014 | Muthukumar et al. ....... 717/106 |

OTHER PUBLICATIONS

OStrand T et al: ., A Visual Test Development Environment for GUI Systems, Software Engineering Notes, ACM, New York, NY, US, vol. 23, No. 2, Mar. 1998, pp. 82-92, XP000740949.

Korean Intellectual Property Office, International Search Report and Written Opinion, Jan. 11, 2012, 8 pages, Daejeon, Republic of Korea.

* cited by examiner

AUTOMATIC CLASSIFICATION ADJUSTMENT OF RECORDED ACTIONS FOR AUTOMATION SCRIPT

CROSS-REFERENCE TO RELATED APPLICATION

This application is a national stage application under 35 U.S.C. §371 of PCT/US2011/034941, filed May 3, 2011.

BACKGROUND

Automated application testing may be applied to test application programs, including network-based or Internet-based applications, under extreme use conditions. In such testing, a testing application may simulate a large number of users that are interacting with the application being tested.

For example, an automatic testing application may automatically execute a script that simulates a user interacting with the application being tested. One way of conveniently generating such a script is to record the actions of a human operator who is interacting with the application to be tested. A script generation application may then select from the recorded actions those actions that are to be included in the script.

BRIEF DESCRIPTION OF THE DRAWINGS

Reference is made to the accompanying drawings, in which.

DETAILED DESCRIPTION

Figure 1:
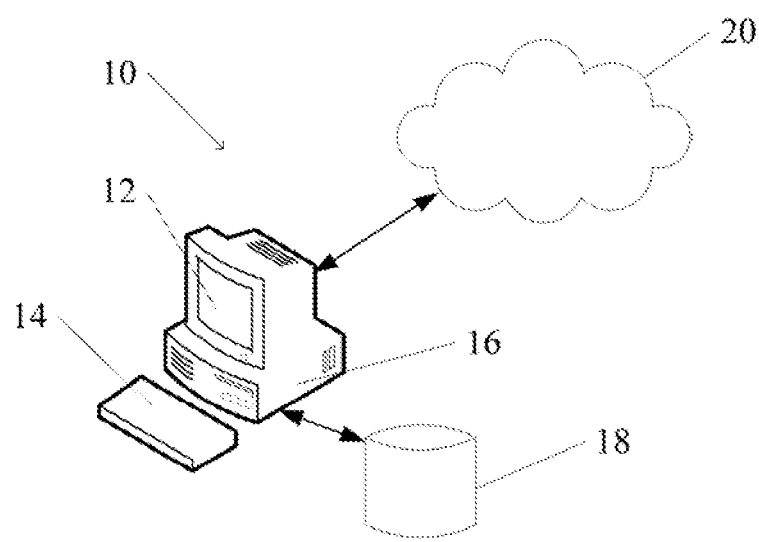
FIG. 1 is a schematic diagram of a system for automatic classification adjustment of recorded user actions for an automation script, in accordance with an embodiment of the invention.

Automatic classification adjustment of recorded user actions for an automation script, in accordance with an embodiment of the invention, includes automatic reclassification of recorded actions when an automation script fails to execute. Automatically reclassifying the recorded actions may enable a revised script to execute successfully, with minimal or no direct involvement of a human user or operator in the revision process.

An automation script includes of subsequence (to be understood as including all or some) of a sequence of recorded user actions. Each of the recorded user actions may be classified in accordance with one or more classifications. The actions of the sequence are included in the sub-sequence in accordance with the classifications.

For example, creation of an automation script may include classifying as either relevant or irrelevant one or more recorded actions of a user who is interacting with a user interface. A script generation application may then generate an automatic testing script by including only those recorded events that are classified as relevant. Similarly classification may include any other suitable classification of recorded actions, for example a classification related to an interpretation of a recorded action (e.g. causing an absolute change of state or a relative change of state).

For example, the user may operate a pointing device such as a mouse to move a cursor across a displayed user interface. Such a user interface typically includes several displayed screen controls from which the user may select, e.g. by pushing a mouse button or keyboard key, when the cursor is positioned over the selected screen control. While navigating the cursor to a screen control to selected, the cursor may pass over one or more other screen controls. The cursor passing over one of the other screen controls may also generate events by affecting the user interface. For example, a cursor passing, over a screen control may cause the screen control to change its appearance, or a dropdown menu may appear. Such user actions are also recorded as events by the script generation application.

The script generation application generates a script that includes events that were selected from the recorded events. The script may initially select those events that are deemed to be relevant or significant in accordance with predetermined criteria (e.g. related to a predetermined significance level). For example, the predetermined criteria may limit the script generation application to initial selection of only those events that included selection of a screen control.

An action that was deemed to be irrelevant or insignificant may be omitted from the generated script.

In replaying the script, the computer simulates the recorded user actions that generated the events that were included in the script. In replaying the script, one of the replayed actions may fail. For example, a screen control that is to be selected is not present in the user interface, or a screen control may be in a state that is incompatible with replaying the action. When such failure is detected, a script generation application, in accordance with an embodiment of the invention, attempts to reclassify events so as to modify the script such that the replayed action may be successfully executed.

In the example of classifying an event as either relevant or irrelevant, in accordance with an embodiment of the invention, a failure may result from misclassifying as irrelevant an event that is essential for successful execution of the script. When a failure is detected, the script generation application executes an automatic procedure of reclassifying recorded events that were previously classified as irrelevant or insignificant. As a result of the reclassification, the script generation application may revise the generated script.

For example, the script generation application may first seek a recorded action that precedes the failed action and that had been classified as irrelevant, and thus omitted from the script. The script generation application then attempts to execute that omitted action. If the omitted action executes successfully, the execution of the previously failed action is again attempted. If either the previously omitted action or the previously failed action fails to execute, then the script generation application searches for another recorded action that was recorded previous to the first omitted action, and was also classified as irrelevant. The procedure of reclassifying recorded events and revising the script is repeated until the previously failed action is executed successfully. At this point, the revised script that includes the previously omitted actions replaces the originally generated script.

Modifications to the script may be presented to a user for approval.

FIG. 1 is a schematic diagram of a system for automatic classification adjustment of recorded user actions for an automation script, in accordance with an embodiment of the invention. System 10 may include an output device 12, such as a display screen or other appropriate output device, for enabling a user to interact with a presented user interface. Output device 12 may present a user with results of a user action. A script generation application may present a user via output device 12 with a script, script options, or a result of running a script.

System 10 may include an input device 14. For example, input device 14 may include one or more user operable input devices such as a keyboard, keypad, pointing device, button, or other appropriate input device. A user operating input device 14 may input instructions to a script generation application, and may perform operations that result in actions or events that are recorded by a script generation application.

System 10 includes processor 16. Processor 16 may include a plurality of interacting or intercommunicating separate processors. Processor 16 may be programmed to run a script generation application. Processor 16 may, in addition, be programmed to run one or more additional applications. For example, processor 16 may be programmed to run an application for interacting with a remote site via network 20.

Processor 16 may interact with a data storage device 18. Storage device 18 may include one or more fixed or removable data storage devices. Data storage device 18 may store programmed instructions for running one or more applications on processor 16. Data storage device 18 may be utilized by a script generation application to store recorded actions and generated scripts.

System 10 may communicate or interact with one or more remote devices, sites, systems, servers, or processors via network 20. Network 20 may include any type of wired or wireless communications network that enables two or more systems to communicate or interact. For example, network 20 may represent the Internet.

Figure 2:
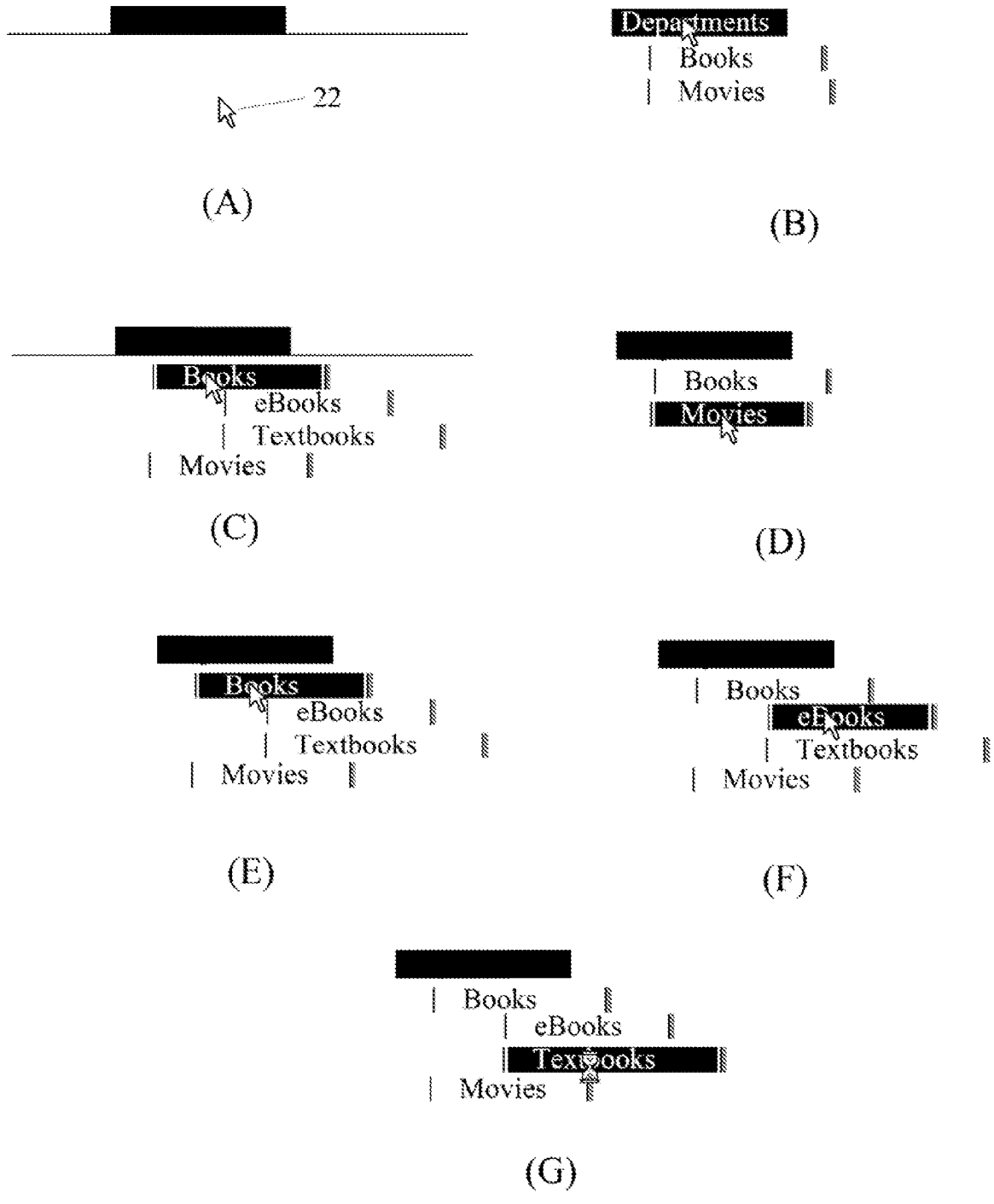
FIG. 2 shows an example of a user interaction with a user interface to which automatic classification adjustment of recorded user actions for an automation script, in accordance with an embodiment of the invention, may be applied.

Principles of an embodiment of the invention may be illustrated with reference to an example of a menu that includes dropdown items. FIG. 2 shows an example of a user interaction with a user interface to which automatic classification adjustment of recorded user actions for an automation script, in accordance with an embodiment of the invention, may be applied.

In accordance with an embodiment of the invention, user initiated events are recorded. (For example, as opposed to simply recording every cursor or mouse movement, whether or not an event is generated.)

In FIG. 2, a user-controlled cursor 22 interacts with a menu. The menu shown is designed such that when the cursor hovers over a menu item (e.g. remains positioned over that menu item for longer than a predetermined threshold time), that menu item is selected and highlighted. If a dropdown menu is associated with the selected menu item, the dropdown menu appears below the selected menu item.

In the user interaction shown, the following user actions and events are recorded:

(A) Navigate to a web page that includes the "Departments" menu item.

(B) Move cursor to, and hover over, the "Departments" menu item. A dropdown menu appears below the "Departments" menu item.

(C) Move cursor to, and hover over, the "Books" menu item of the dropdown menu. A second dropdown menu appears below the "Books" menu item.

(D) Move cursor to, and hover over, the "Movies" menu item of the first dropdown menu. The second dropdown menu has disappeared.

(E) Move cursor to, and hover over, the "Books" menu item of the first dropdown menu. The second dropdown menu reappears below the "Books" menu item.

(F) Move cursor to, and hover over, the "eBooks" menu item of the second dropdown menu.

(G) Move cursor to, and click on (thus selecting), the "Textbooks" menu item of the second dropdown menu.

The result of the series of actions is clicking on the "Textbooks" menu item (performed in action G). A human observer may note that execution of actions A, B, and E (or C) are necessary for successful execution of action G. Without first performing actions A, B, and E, the "Textbooks" menu item would not be visible and action G could not be executed. On the other hand, execution of actions C (when E is executed), D, and F is not relevant to correct performance of action G. In this case, classification of the recorded actions may include classifying each recorded action with regard to its relevance in attaining the result (e.g. clicking on the "Textbooks" menu item).

A script generation application may initially classify any action in accordance with predetermined criteria. For example, such criteria may determine that any action that involves only cursor movement is to be initially classified as irrelevant. Thus, the script generation application may initially classify as relevant only those actions that entail a change of a user interface screen (e.g. navigation to a web site) or that involve selection of a screen control (e.g. clicking on a menu item). In accordance with such criteria, a script generation application may initially classify only recorded actions A and G as relevant. Thus, an initial script may include only recorded actions A and G.

An attempt to run the initial script fails, since the "Textbooks" menu item that is required for successful execution of recorded action G is absent. Automatic classification of user actions, in accordance with an embodiment of the invention, includes automatically reclassifying the recorded actions so as to generate an automation script that may execute successfully.

Figure 3:
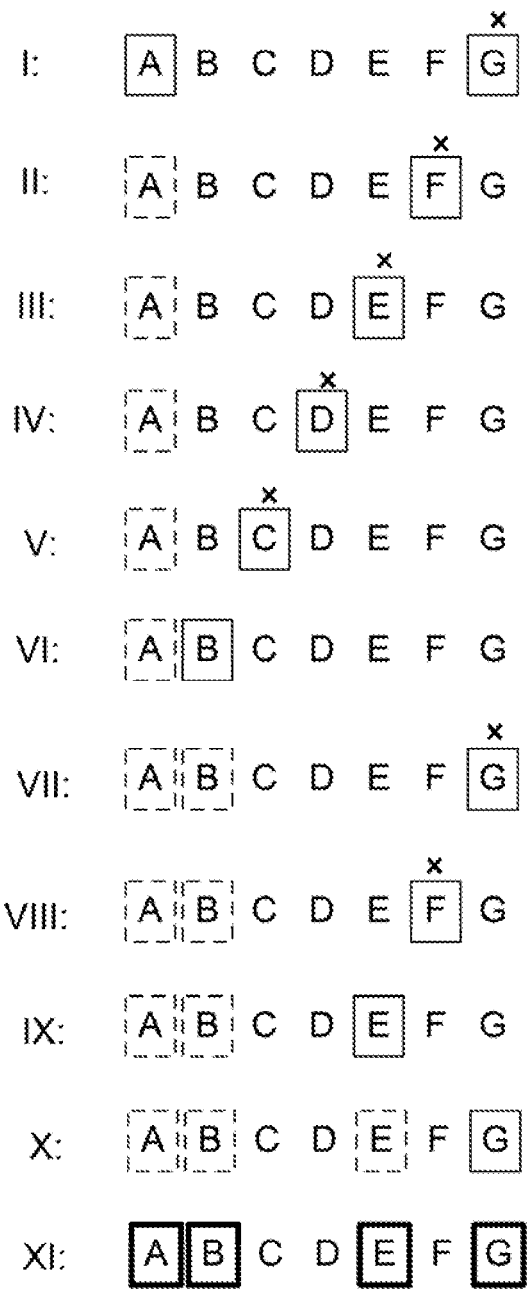
FIG. 3 illustrates application of automatic classification adjustment of recorded user actions, in accordance with an embodiment of the invention, to an automation script based on the user interaction illustrated in FIG. 2

FIG. 3 illustrates application of automatic classification adjustment of recorded user actions, in accordance with an embodiment of the invention, to an automation script based on the user interaction illustrated in FIG. 2.

In stage I, the (initial) script includes only recorded actions A and G (as indicated by the borders around A and G). Execution of the script in stage I results in successful execution of recorded action A, but in failure to execute recorded action G as described above (indicated by the symbol x above the G). For example, failure to execute of recorded action G may be identified by the absence of a relevant screen control, in this case the menu item "Textbooks". Typically, as soon as the absence of the screen control is noted, the attempted action is considered to have failed. Thus, the state of the user interface being tested may remain as it was after execution of recorded action A.

Automatic classification of user actions, in accordance with an embodiment of the invention, begins a process of reclassifying as relevant one or more recorded actions that had previously been classified as irrelevant. The process may continue until recorded actions A and G are executed successfully.

In accordance with an embodiment of the invention, the script generation application, starting with the failed action (recorded action G), begins to reclassify the recorded actions that were previously classified as irrelevant to achieving the result. Thus, it may attempt to execute a recorded action that was previously classified as irrelevant, and thus omitted from the initial script. Thus, in stages II through V, the script generation application attempts to execute in turn each of recorded actions F, E, D, and C, respectively. Each of recorded actions F, E, D, and C fails, since successful execution of those recorded actions depends on the presence of a dropdown menu that is not yet present after the previously successful execution of recorded action A (the previously successful execution of A being indicated by the dashed border).

In stage VI, the script generation application successfully executes recorded action B. Successful execution of recorded action B causes the first dropdown menu to appear below the "Departments" menu item.

In the event that the script generation application fails to successfully execute any previously omitted recorded action, the script generation application may abort the process of reclassifying actions. In this case, failure to execute may be assumed to result from a cause other than misclassification of recorded actions.

Once the script generation application has successfully executed a previously omitted recorded action, recorded action B in this example, the script generation application attempts to complete execution of the script. Thus, in stage VII, the script generation application attempts to execute the originally failed action, recorded action G after successful execution of recorded actions A and B. In this case also, execution of action G fails, since the second dropdown menu containing the menu item "Textbooks" is not present.

The script generation application then repeats the procedure of attempting to execute a previously omitted recorded action until another a previously omitted recorded action is found that executes successfully. Execution of the originally failed action is then attempted again. This procedure is repeated iteratively until the originally failed action is executed successfully.

In the example of FIG. 3, in stage VIII, the script generation application attempts to execute previously omitted recorded action F. The attempt to execute recorded action F fails since the second dropdown menu containing the menu item "eBooks" is not present.

In stage IX, the script generation application successfully executes recorded action E. Successful execution of recorded action E causes the second dropdown menu, containing the menu item "Textbooks", to appear.

Thus, in stage X, the script generation application successfully executes' the originally failed action, recorded action G. Therefore, recorded actions B and E may be reclassified as relevant, and the revised script indicated by stage XI may replace the initial script indicated in stage I. The revised script may then be used to automatically execute in order the recorded actions A, B, E, and G. For example, the revised script may be run repeatedly or concurrently as part of a procedure for testing an application, e.g. a network-based application.

The example shown in FIGS. 2 and 3 referred specifically to cursor or mouse movements, and more specifically to a menu having dropdown menus. Mouse movements in particular may be ambiguous and problematic, and thus be prone to misclassification with respect to classification of their relevance. Thus, automatic classification of user actions for an automation script, in accordance with an embodiment of the invention, may be especially applicable to such mouse or cursor movements.

However automatic classification may also be of benefit when applied to other types of recorded user actions. For example, clicking on or selecting an edit box, or similar screen control or object, using a mouse or a keyboard often only causes the object to receive focus. Thus, such an action may be omitted from an initial automatically generated script. However, in some cases, such as when a content of the edit box is to be edited, receiving focus may be essential for successful execution of subsequent keyboard actions. Similarly, in an interaction combining use of a pointing device and a keyboard, receiving focus may be essential (e.g. when pointing with a mouse while pressing a key on a keyboard in place of clicking a mouse button).

Although automatic classification, as illustrated in FIG. 3, involves testing previously omitted recorded actions in reverse chronological order (testing execution of the last-recorded actions first, then testing earlier actions that were recorded earlier), testing omitted actions in any order may similarly yield a sequence of recorded actions that when executed, achieves the desired result (in the example of FIG. 3, clicking on the "Textbooks" menu item).

For example, in the example of FIGS. 2 and 3, had stage IX included execution of recorded action C in place of recorded action E, recorded action C would also have successfully been executed. Subsequent stages may have determined that recorded action E would be executed successfully in place of recorded action C. In this case, priority may have been given to including later recorded action E in the script rather than earlier recorded action C.

Although the example of FIG. 3 related to including or excluding recorded actions from a generated script (e.g. classifying as relevant or irrelevant), action classification in accordance with an embodiment of the invention may also be applied to other classification of recorded user actions. For example, classifying a recorded user action may be understood to include interpretation of an ambiguous recorded action.

In particular, action classification in accordance with an embodiment of the invention may be applied to classifying an action in terms of an interpretation of the action. In some cases a single recorded action may be subject to various possible interpretations. For example, selection of control such as a radio button or check box may be understood in terms of an absolute result (selecting option A or option B, checking a box), or in terms of a relative result (toggling between option A and option B, changing the status of a box). Thus, action classification in accordance with an embodiment of the invention may be applied to selecting an interpretation of the recorded action. For example, an initially generated script may include a user action that was interpreted in accordance with one possible interpretation. If execution of a recorded action of the script fails, action classification in accordance with an embodiment of the invention may be applied. Application of action classification may automatically test alternative interpretations of one or more recorded actions so as to achieve successful execution of the script.

Automatic action classification, in accordance with an embodiment of the present invention, may require user confirmation of changes to a generated script. For example, a script generation application may display an automatically generated revision of a script, and may await confirmation by a human user prior to utilizing or saving the revised script. The human user may then decide to accept the revision, or restore a previously generated version of the script.

Figure 4:
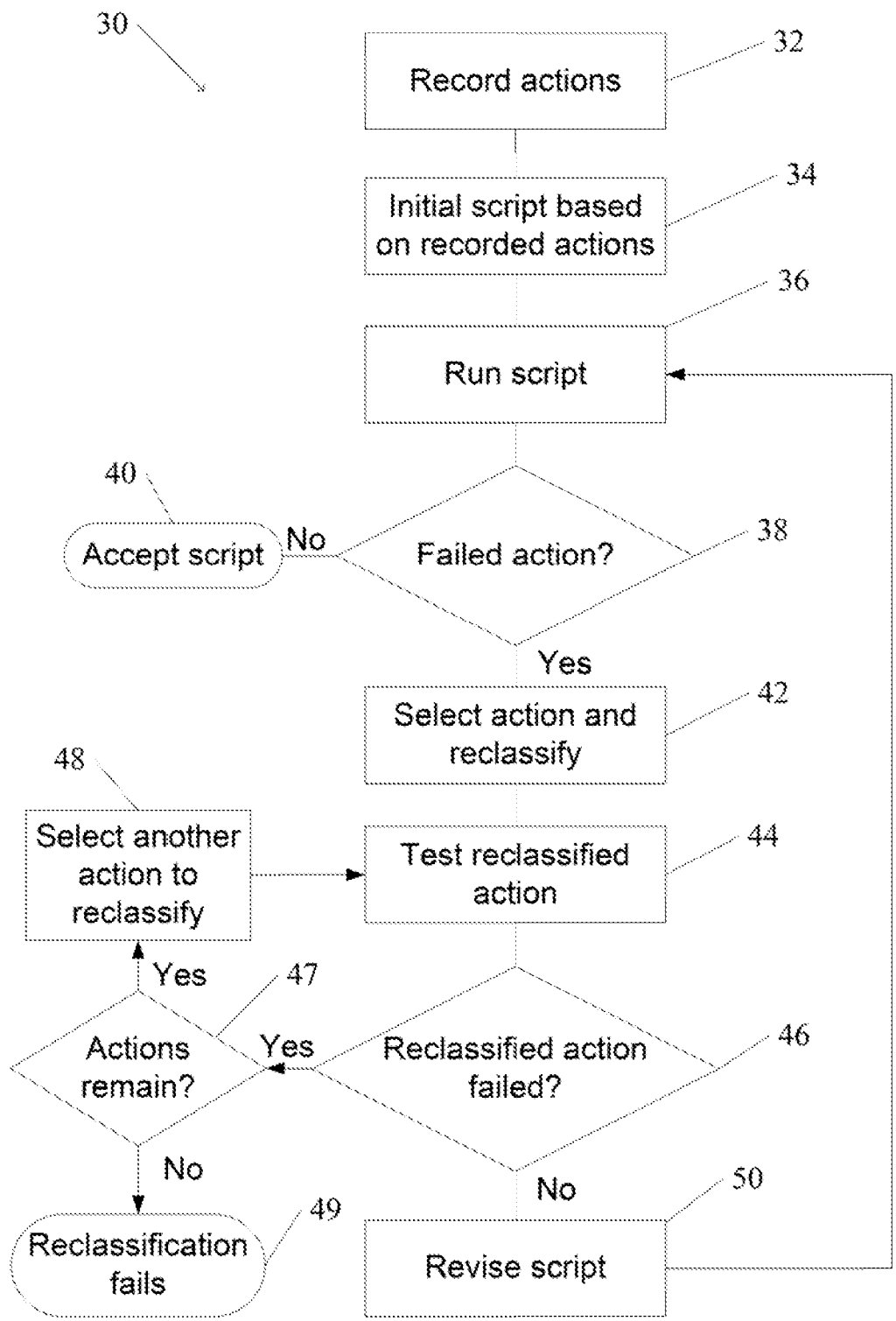
FIG. 4 is a flowchart for a method of automatic classification adjustment of recorded user actions for an automation script, in accordance with an embodiment of the invention.

FIG. 4 is a flowchart for a method of automatic classification adjustment of recorded user actions for an automation script, in accordance with an embodiment of the invention. Automatic classification method 30 includes reclassifying recorded actions for inclusion in a script such as to enable a script to run successfully. For example, automatic classification method 30 may be performed by an automatic script generation application running a processor.

It should be understood that the division of automatic classification method 30 into discrete component steps, as illustrated in FIG. 4, is for clarity of the description and for convenience only. Automatic classification method 30 may be divided into one or more alternative sets of discrete steps with equivalent results. All such alternative divisions of the method into discrete steps should be understood as falling within the scope of embodiments of the invention.

Unless stated otherwise, the order of component steps of automatic classification method 30 that is shown in FIG. 4 has been selected for clarity of the description and for convenience only. Steps of automatic classification method 30 may be performed in alternative order, or concurrently, with equivalent results. All such alternative ordering of steps of automatic classification method 30 should be understood as falling within the scope of embodiments of the invention.

One or more user actions may be recorded (step 32). The user actions may be recorded as the user interacts with a graphical user interface or other user interface, e.g. of a remote or network-based application running on a remote system or server.

For example, an automatic script generation application may include a record mode in which user actions are recorded. User actions may be recorded as events, or, alternatively, as any action (e.g. mouse, keyboard, or cursor movements) that are transmitted over a network.

Alternatively to recording user actions, a file or set of previously stored or simulated recorded actions may be provided.

An initial automation script may be assembled, based on the recorded actions (step 34). The automation script may be designed for use by a suitable application, such as an automatic testing application, to automatically simulate actions of the user. The initial automation script may be based on an initial classification of each of the recorded actions. For example, classification of an action may include classification as either relevant (to be included in the script) or irrelevant (to be omitted from the script). As another example, classification of a recorded action may be related to an interpretation of an ambiguous action (e.g. absolute or relative change of state of a screen control).

An initial classification of recorded actions may be based on predetermined criteria. For example, such predetermined criteria may include a user selected or automatically selected default threshold level of significance that is automatically assigned to each recorded action, or a user selected or automatically selected default interpretation of a recorded action.

All or part of the current script (in this case the initial script) may then be run, e.g. by an automatic script generation application (step 36). For example, each or the actions that are included in the script may be executed sequentially. Running the script may thus attempt to simulate the recorded user interactions.

In running the current script, one of the executed actions may fail (step 38). For example, a screen control that is to be manipulated as part of execution of the failed action may not be present, or may not be in an expected state. For example, if the action includes selecting an item from a dropdown menu, that dropdown menu may be hidden. If the action includes checking a check box or selecting a radio button, that check box may already be checked or the radio button may already be selected.

If the entire current script runs without any failed actions, the current script may be accepted (step 40). For example, the current script may be saved for use by an automatic testing application.

When an action of the current script fails to execute, one of the recorded actions, either the failed action or an action that was recorded prior to the failed action, may be reclassified by altering the classification of that recorded action (step 42). For example, a prior recorded action that had been previously classified as irrelevant (and was thus omitted from the current script) may be classified as relevant. (Typically, the prior recorded action that is reclassified first is the previously omitted action that was recorded last prior to the failed action.) As another example, if the failed action had been classified as causing an absolute change to a screen control, the failed action may be reclassified as causing a relative change.

An attempt may then be made to execute the reclassified action (step 44), (In some cases, e.g. where a previous failure to execute has modified a user interface, execution of one or more previous actions may require repetition. Typically, failure to execute is noted, e.g. by noting the absence of a suitable screen control to operate on, prior to performing any actual operation that may lead to such a modification.)

The reclassified action may fail to execute (step 46). Another action may remain that is available for reclassification (step 47). For example, one or more recorded actions that had not yet been tested after reclassification, or for which an untried reclassification option remains, may exist among the recorded actions. In this case, one of the remaining recorded actions (e.g. an action that was recorded immediately preceding the action that was last reclassified) may be selected for reclassification (step 48). Alternatively, a different reclassification may be applied to the selected action.

Execution of the newly reclassified action is then attempted (returning to step 44). This process of selecting another recorded action for reclassification, and testing the reclassified action (repeating steps 46-48 and step 44) continues until a reclassified action is successfully executed, or until no more recorded actions remain available for reclassification.

If all possible reclassifications have been attempted on all of the recorded actions, and none of the reclassified actions was successfully executed, reclassification may be considered to have failed to correct the script (step 49). In this case, failure of the script to execute may be assumed to have occurred due to a cause that is not correctable by reclassification of a recorded action. A script generation application may be provided with one or more other techniques for automatically correcting a script or for determining a cause of script failure. Thus, upon failure of reclassification to result in a script that successfully runs, the script generation application may apply one or more of the other techniques in order to correct or diagnose the script.

If a reclassified action successfully executes (step 46), the reclassified action may be included (at least tentatively) in a revised script (step 50). The revised script may then replace the current script, and the current script, or part of it, may be run (returning to step 36). For example, an attempt may be made again to execute the action of the script that had failed previously (step 28 of the previous iteration). The process of reclassifying actions and revising the script continues until all actions of the script successfully execute and the revised script is accepted (step 40). Alternatively, the process continues until it is determined that further reclassification of recorded actions cannot yield a script that can be completely executed (step 49).

Automatic classification of user actions for an automation script, in accordance with an embodiment of the invention, may be implemented in the form of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for automatic revision of an automation script, the method comprising:
    obtaining a sequence of classified recorded actions, wherein each action included in the sequence is classified as either relevant or irrelevant to attaining a result;
    obtaining an automation script, the automation script including a sub-sequence of said sequence of classified recorded actions, wherein each action included in the automation script is classified as relevant;
    executing at least a portion of the automation script;
    in response to a failure of a first action included in the automation script to execute:
        reclassifying at least one action of said sequence of classified recorded actions; and
        in response to a determination that the first action execute executes successfully after the reclassifying, revising the automation script based on the reclassifying.

2. The method of claim 1, performed iteratively.

3. The method of claim 1, further comprising classifying each action included in the sequence, wherein the classifying comprises an interpretation of each action based on a predetermined significance level.

4. The method of claim 1, wherein the reclassifying of the at least one action comprises iteratively performing:
    selecting a second action of the sequence to be a currently selected action;
    reclassifying the currently selected action as relevant;
    attempting to execute the automation script including the currently selected action; and
    if the attempted execution of the automation script fails, initiating another iteration by selecting another action of the sequence to be the currently selected action.

5. The method of claim 4, wherein the currently selected action is selected from the sequence in reverse chronological order.

6. The method of claim 1, comprising using the revised automation script for automated application testing.

7. A non-transitory computer readable storage medium containing instructions that when executed cause a processor to:
    obtain a sequence of classified recorded actions, wherein each action included in the sequence is classified as relevant or irrelevant to a test result;
    obtain an automation script, the automation script including a sub-sequence of said sequence of classified recorded actions, wherein each action included in the automation script is classified as relevant to the test result;
    execute at least a portion of the automation script;
    in response to a failure of a first action included in the automation script to execute:
        reclassify at least one action of said sequence of classified recorded actions; and
        in response to a determination that the first action executes successfully after the at least one action is reclassified, revise the automation script based on the at least one action.

8. The non-transitory computer readable storage medium of claim 7, wherein the at least one action includes a second action of the sequence, wherein the second action is reclassified as irrelevant in response to the failure of the first action.

9. The non-transitory computer readable storage medium of claim 8, wherein the at least one action also includes a third action of the sequence, wherein the third action is reclassified as relevant in response to the failure of the first action.

10. The non-transitory computer readable storage medium of claim 7, wherein the instructions further cause the processor to:
    select a second action of the sequence to be a currently selected action;
    reclassify the currently selected action as relevant;
    attempt to execute the automation script including the currently selected action; and
    if the attempted execution of the automation script fails, select another action of the sequence to be the currently selected action.

11. The non-transitory computer readable storage medium of claim 10, wherein the currently selected action is selected from the sequence in reverse chronological order.

12. The non-transitory computer readable storage medium of claim 7, comprising using the revised automation script for automated application testing.

13. A data processing system comprising:
    a processing unit in communication with a computer readable storage medium, wherein the computer readable storage medium contains a set of instructions, wherein the processing unit is designed to carry out the set of instructions to:
        obtain a sequence of classified recorded actions, wherein each action included in the sequence is classified as relevant or irrelevant to a test result;
        obtain an automation script, the automation script including a sub-sequence of said sequence of classified recorded actions, wherein each action included in the automation script is classified as relevant to the test result;
        execute at least a portion of the automation script;
        in response to a failure of a first action included in the automation script to execute:
            reclassify at least one action of said sequence of classified recorded actions; and
            in response to a determination that the first action executes successfully after the reclassifying, revise the automation script based on the at least one action.

14. The system of claim 13, comprising a network connection.

15. The system of claim 13, wherein said at least one classified recorded action comprises an interaction of a user with a remote user interface.

16. The system of claim 13, comprising an automatic testing system.

17. The system of claim 13, wherein the at least one action comprises the first action.

18. The system of claim 13, wherein the at least one action comprises a second action classified as irrelevant, and wherein the second action is reclassified in response to the failure of the first action.

19. The system of claim 18, wherein the at least one action further comprises a third action classified as relevant, and wherein the third action is reclassified as irrelevant in response to the failure of the first action.

20. The method of claim 1, wherein reclassifying the at least one action comprises:
- reclassifying a second action as relevant to attaining the result; and
- reclassifying a third action as irrelevant to attaining the result.

* * * * *

UNITED STATES PATENT AND TRADEMARK OFFICE
CERTIFICATE OF CORRECTION

PATENT NO. : 9,223,647 B2
APPLICATION NO. : 14/114145
DATED : December 29, 2015
INVENTOR(S) : Dror Schwartz et al.

It is certified that error appears in the above-identified patent and that said Letters Patent is hereby corrected as shown below:

On the Title page, in item (75), Inventors, in column 1, line 2, delete "Mazkerel" and insert -- Mazkeret --, therefor.

On the Title page, in item (75), Inventors, in column 1, line 3, delete "Mazkerel" and insert -- Mazkeret --, therefor.

In the Specification
In column 1, lines 42, delete "FIG. 2 and" and insert -- FIG. 2; and --, therefor.

In column 1, lines 57, delete "subsequence" and insert -- sub-sequence --, therefor.

In column 2, lines 15, delete "passing," and insert -- passing --, therefor.

In column 5, lines 45, delete "executes'" and insert -- executes --, therefor.

In column 5, lines 63, delete "However" and insert -- However, --, therefor.

In column 8, lines 14, delete "(step 44)," and insert -- (step 44). --, therefor.

In the Claims
In column 9, lines 42, in Claim 1, delete "execute executes" and insert -- executes --, therefor.

Signed and Sealed this
Twelfth Day of July, 2016

Michelle K. Lee
*Director of the United States Patent and Trademark Office*